June 25, 1968     L. MARTIN     3,389,908
DEVICE FOR TRANSFERRING FLAT OR SHEET PRODUCTS
Filed Sept. 22, 1966     2 Sheets-Sheet 1

June 25, 1968  L. MARTIN  3,389,908

DEVICE FOR TRANSFERRING FLAT OR SHEET PRODUCTS

Filed Sept. 22, 1966  2 Sheets-Sheet 2

United States Patent Office 3,389,908
Patented June 25, 1968

3,389,908
DEVICE FOR TRANSFERRING FLAT OR SHEET PRODUCTS
Louis Martin, 10 Quai Victor Augagneur, Lyon, France
Filed Sept. 22, 1966, Ser. No. 581,305
Claims priority, application France, Nov. 17, 1965, 46,592, Patent 1,454,859
6 Claims. (Cl. 271—74)

ABSTRACT OF THE DISCLOSURE

A device for transferring flat or sheet products, composed of an endless belt having an outer surface with transverse flutes which passes through an enclosure in which the spaces between the flutes are subjected to suction pressure at the lateral edge of the belt, whereby a product on the belt is held thereagainst due to the difference between atmospheric pressure acting on the outer surface of the product and the suction pressure acting on its under surface.

---

The present invention relates to a device adapted to transfer flat or sheet products, namely sheets of corrugated cardboard, from a storing station where they are stationary to a working station or to some machine.

The device of the invention includes essentially an endless belt which has at least its outer surface fluted transversely and travels on two pulleys to pass through an enclosure delimited laterally by the two edges of the channel inside which it travels, and longitudinally by joints, means being provided for creating in said enclosure a suction which extends into the flutes on said belt and allows, with the aid of atmospheric pressure, shifting readily within the area defined by the above-mentioned enclosure any article put on the belt, and further means being provided for preventing said suction from pressing the belt tight against the bottom of said channel.

Said transfer device, which is generally intended for use with conventional machines, may cause the belt to slide slightly over the driving portion, although the latter may be sufficiently wide so that the adhesion may be considered as satisfactory. However, the cyclic operation of said device, in which each new feed to the enclosure subjected to suction, or gripping area, is independent of the previous feed, has for its result that any sliding, is not cumulative and may only cause some scattering in the transfer operation.

However, and in particular in the case where it is necessary for the belt to have a uniform speed and it is thus essential to obtain a wholly positive drive by the driving pulley, said belt is provided with notches in both its surfaces and is then driven by a drive pulley provided with notches and guided by a guide pulley which is also provided with notches.

The invention will now be explained in further detail in the following description, with reference to the appended diagrammatic drawing which illustrates, by way of non-limiting examples, two embodiments of the device of the invention. In said drawing.

Figure 1:
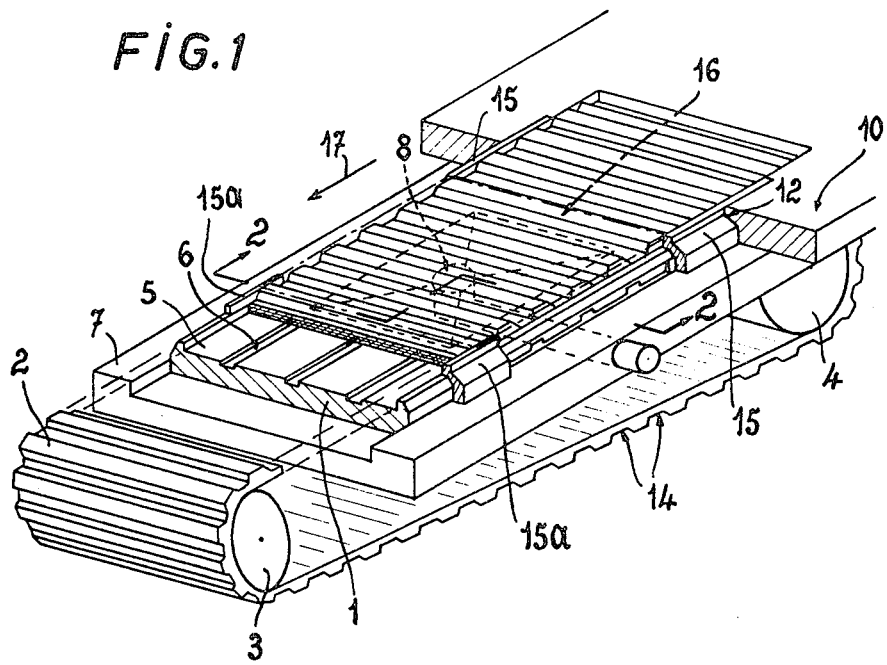
FIGURE 1 is a perspective view, partly in section, of a first embodiment of said device.
Figure 2:
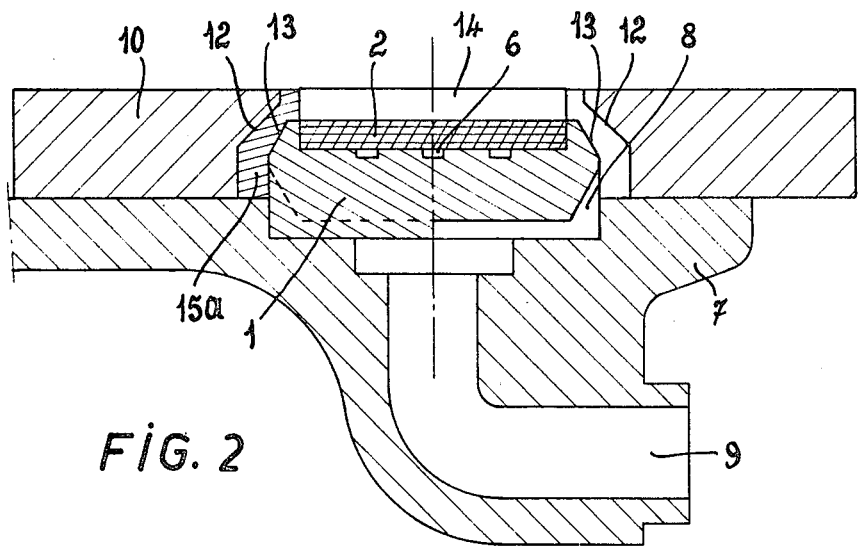
FIGURE 2 is, on an enlarged scale, a sectional view along line 2—2 in FIGURE 1.

According to the invention, a belt 2 which externally fluted is driven at one of its ends by a smooth pulley 3 and is guided at its other end by a pulley 4 which is also smooth.

The taut portion of said belt 2 passes through a channel 5 with without being held, the section of said channel being substantially equal to the transverse cross section of said belt.

Said channel 5 is provided in a plate 1 the upper face of which is provided, opposite the inner face of the belt 2, with three longitudinal grooves 6, while its underface has its middle portion provided with a transverse clearance 8 connected with a vacuum circuit (not shown) through a bore 9 passing through the frame 7.

The useful rectilinear portion of the belt 2 is enframed by a plate 10 bearing on the frame 7, the upper face of said plate being slightly higher than the upper faces of the flutes on the belt 2.

The two inner edges 12 of said plate 10 have sections such that, in cooperation with the outer sections of the two edges 13 of the channel 5, they form a passageway which enables the suction prevailing in the clearance 8 to be appplied to the recesses 14 in the fluted belt 2.

Joints 15 and 15a, the sections of which correspond to that of said passageway, are located between the edges 12 of the plate 10 and the edges 13 of the channel 5, upstream and downstream with respect to the gripping area which they define as shown at 16 in FIGURE 1.

When a sheet of material is disposed on the plate 10 over the gripping area 16 and a vacuum pump in the vacuum circuit is started, a suction prevails in said area.

Said suction is distributed among the recesses 14 in the fluted belt 2 and tends, with the aid of the atmospheric pressure exerting its action on the upper surface of the sheet, to hold the underface of the latter flat on the tops of the flutes of the belt.

The flattening stress thus obtained is in direct ratio to the area of the sheet and the difference of pressure between the atmospheric pressure and the suction pressure created under said sheet.

It can be seen that, when the belt travels in the direction of the arrow 17, each recess 14 passing in front of the joints 15 enters the gripping area 16 and is subjected to suction, while each recess passing in front of the joints 15a leaves said area 16 and is subjected to atmospheric pressure, with the result that the sheet of material is forcibly advanced by the belt 2 in the area 16 owing to the combined action of the gripping force and the motion of the belt 2.

The air consumption is limited to the successive volumes of the recesses 14 delimited by the flutes of the belt in the gripping area 16, and to the small leaks resulting from the functional play of the belt 2 inside the channel 5.

The grooves 6 connect the inner surface of the belt 2 with atmospheric pressure so as to prevent the above-mentioned small leaks from tending to hold said belt 2 tight against the bottom of the channel 5, so that the belt 2 is fully free inside its channel.

The difference of level between the plate 10, the belt 2 and the edges 13 of the channel 5 tends to ensure a very good gripping ability.

Depending on the type of the machine said device is to feed, the belt 2 can be driven with a variable motion, and the feed to the gripping area 16 can be either continuous or cyclic, all such motions being controlled by a programmer inserted in the control circuit.

Figure 3:
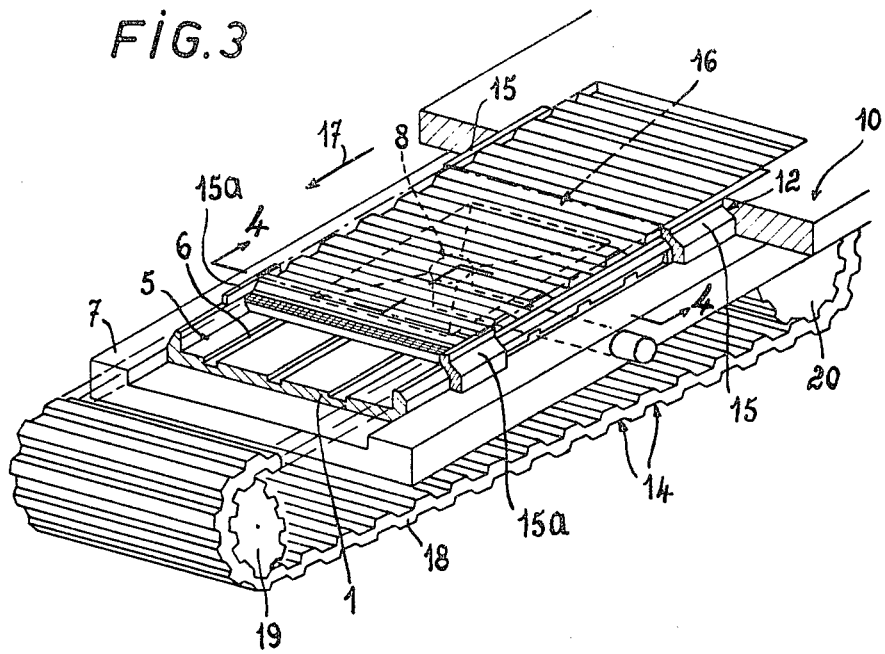
FIGURE 3 is a perspective view, partly in section, of a modified embodiment.
Figure 4:
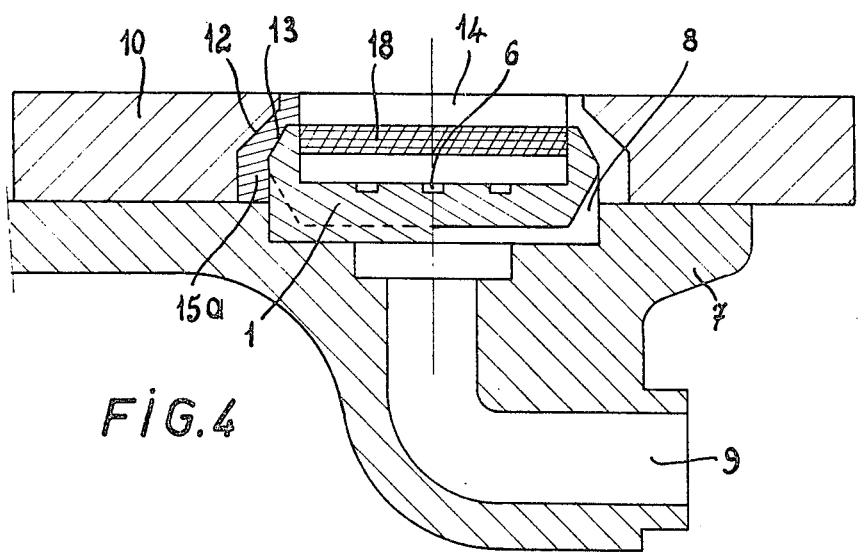
FIGURE 4 is, on an enlarged scale, a sectional view along line 4—4 in FIGURE 3.

FIGURES 3 and 4 illustrate a modified embodiment of the device of the invention in which the belt 18 is provided with notches on both its surfaces so as to be positively driven by the notched drive pulley 19 and duly guided by the guide pulley 20 which is also notched.

This arrangement is particularly suitable in the case where a continuous motion of the belt is required, namely for feeding quick cycle automatic machines.

All the other component parts of this latter embodiment are identical with those of the previous example, except that the channel 5 is deeper so as to compensate for the increased thickness of the belt 18.

Obviously, the present invention is not limited to the sole embodiments thereof described hereinabove by way of non-limiting examples. It covers on the contrary all modifications thereof coming within the scope of the appended claims.

What I claim is:

1. A device for transferring flat or sheet products, said device comprising an endless belt having an outer surface with transverse spaced flutes thereon, means engaging the belt to advance the same, means in the path of travel of the belt to define an enclosure through which the belt passes and is laterally bounded, means for establishing a suction pressure in said enclosure which is applied to the belt laterally thereof and thus into the spaces between the flutes thereby to subject a product on the belt to suction pressure tending to hold the product against the belt, the outer surface of the product extending outside the enclosure and being subjected to atmospheric pressure which also tends to hold the product against the belt, and means for preventing the suction pressure in the enclosure from pressing the belt tightly against the bottom of the enclosure.

2. A device as claimed in claim 1, wherein said belt has a smooth inner surface, said means for advancing the belt comprising two smooth pulleys engaging the inner surface of the belt.

3. A device as claimed in claim 1, wherein said means defining the enclosure comprises means defining a channel for the passage of the belt, said channel having a height less than the thickness of the belt, and passageways which open laterally of the flutes for establishing suction pressure in the spaces between the flutes.

4. A device as claimed in claim 3, wherein said means which defines the channel includes a plate, said means for preventing the suction pressure in the enclosure from pressing the belt tightly against the bottom of the enclosure being constituted by grooves in the plate open to the atmosphere and communicating with said channel.

5. A device as claimed in claim 1, wherein said means defining the enclosure comprises a plate having a channel for accommodating the belt during its advance, said channel having a height less than the thickness of the belt such that the belt extends above the plate, and plate means laterally positioned relative to said plate to define therewith a suction pressure passageway which is in communication with the spaces between the flutes at the lateral edges of that portion of the belt which extends above the plate, said plate means having an upper surface at a level slightly higher than the outer surface of the belt.

6. A device as claimed in claim 5, wherein said means defining the enclosure further comprises joint means in said suction pressure passageway at spaced locations in the direction of advance of the belt for limiting the extent of said enclosure, said joint means having a cross-sectional shape which corresponds to that of said suction pressure passageway.

References Cited

UNITED STATES PATENTS 3,140,030    7/1964    Stewart _____ 271—74

RICHARD E. AEGERTER, *Primary Examiner.*